US010575157B2

United States Patent
Gilson et al.

(10) Patent No.: US 10,575,157 B2
(45) Date of Patent: Feb. 25, 2020

(54) RESOURCE CONTROL FOR NETWORK DEVICES

(71) Applicant: Comcast Cable Communications, LLC, Philadelphia, PA (US)

(72) Inventors: Ross Gilson, Philadelphia, PA (US); David Urban, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/053,542

(22) Filed: Feb. 25, 2016

(65) Prior Publication Data

US 2017/0251440 A1    Aug. 31, 2017

(51) Int. Cl.
*H04W 4/80* (2018.01)

(52) U.S. Cl.
CPC .......... *H04W 4/80* (2018.02); *H04Q 2209/25* (2013.01)

(58) Field of Classification Search
CPC .............. Y02B 60/50; H04W 52/0216; H04W 52/0206; H04W 88/08; H04W 52/0235; H04W 52/0229; H04W 84/12; H04W 24/10; H04W 48/16; H04W 52/0212; H04W 88/02; H04W 28/0221; H04W 36/22; H04W 40/005; H04W 40/244
See application file for complete search history.

(56) References Cited

U.S. PATENT DOCUMENTS

| | | | |
|---|---|---|---|
| 8,611,268 B1* | 12/2013 | Thandaveswaran | ........................ H04W 52/0206 370/311 |
| 9,014,682 B1* | 4/2015 | Lambert | ........... H04W 52/0206 455/418 |
| 2013/0225068 A1* | 8/2013 | Kiminki | ............ H04W 52/0216 455/39 |
| 2013/0315121 A1* | 11/2013 | Sampathkumar | ........................... H04W 52/0216 370/311 |
| 2014/0315491 A1* | 10/2014 | Preiszler | ........... H04W 52/0235 455/41.2 |
| 2016/0183185 A1* | 6/2016 | Radhakrishnan | ........................ H04W 52/0209 370/311 |
| 2016/0278014 A1* | 9/2016 | Chen | ..................... H04L 67/125 |

* cited by examiner

*Primary Examiner* — Golam Sorowar
(74) *Attorney, Agent, or Firm* — Ballard Spahr LLP

(57) ABSTRACT

Methods and systems for managing power consumption of network devices are disclosed. An example method can comprise detecting a triggering condition and reducing functionality of a network device based on detecting the triggering condition. The method can comprise detecting, at the network device, a user device, restoring functionality of the network device in response to detecting the user device, and transmitting information to the user device after restoring functionality of the network device.

20 Claims, 7 Drawing Sheets

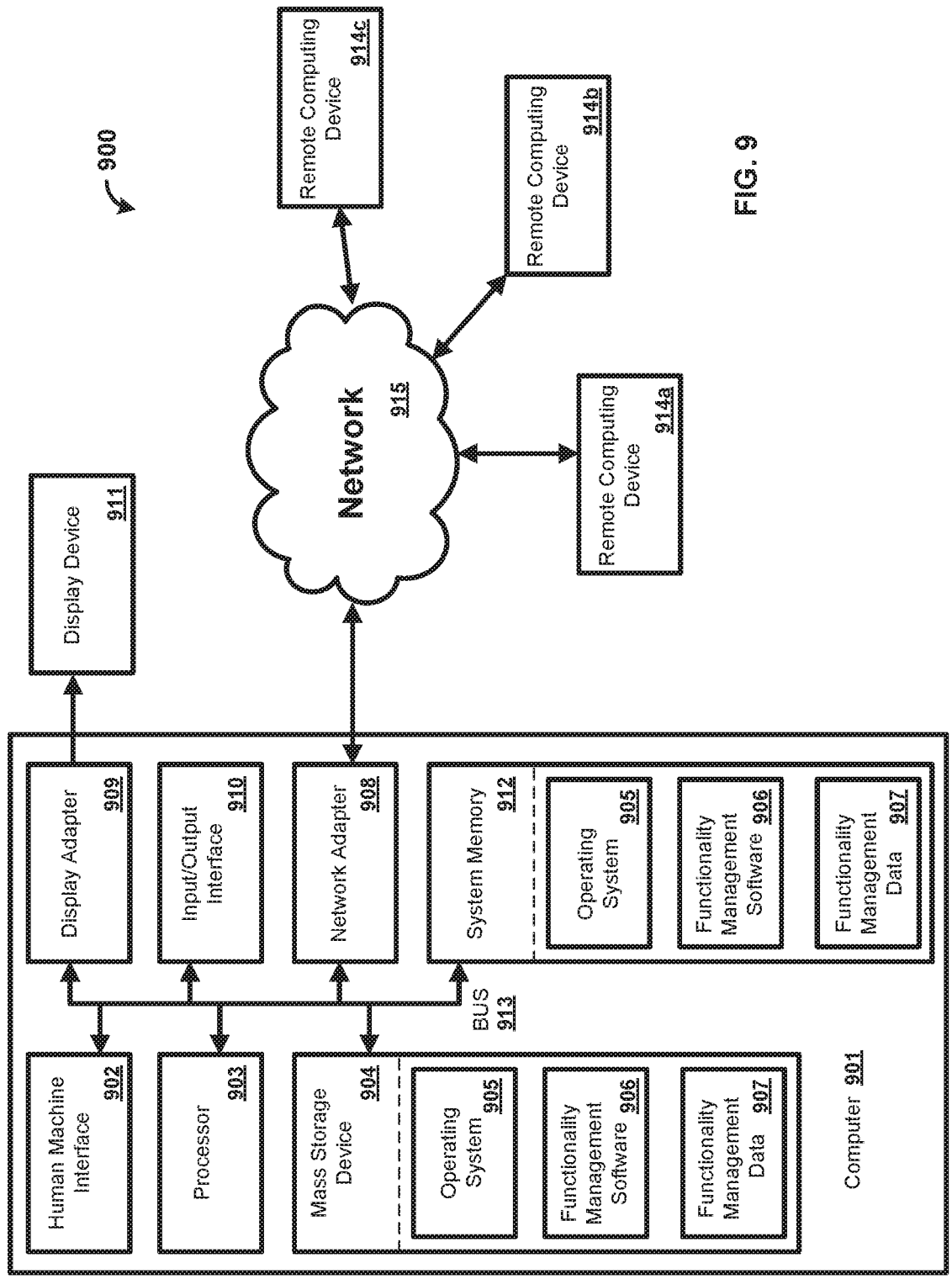

RESOURCE CONTROL FOR NETWORK DEVICES

BACKGROUND

Network devices have different operational constraints depending on the intended usage and features. As networks become more crowded, historical assumptions about operational constraints related to power consumption and other functionalities may be challenged. Network devices, for example, are typically given dedicated resources, such as a direct connection or access to data, power, and other resources. New scenarios for deployment of network devices may challenge this assumption by deploying network devices in locations where such resources may be scarce or fluctuate. Thus, there is therefore a need for more sophisticated methods and systems for managing resources of network devices.

SUMMARY

It is to be understood that both the following general description and the following detailed description are exemplary and explanatory only and are not restrictive. Provided are methods and systems for managing network devices. In a typical scenario, a network device can be connected to a dedicated power supply or source, such as an electrical power source (e.g., an outlet in a home), in order to be "always on." Thus, typical network devices may be programmed to consume resources (e.g., data, memory, processor, power) continuously. Some methods and systems disclosed herein allow for network devices, such as wireless access points, to control resource consumption by selectively reducing and restoring resources and functionality of various network device elements, such as processors, receivers, transmitters, and transceivers. For example, a wireless access point can reduce or stop transmissions of beacons until a user device, such as a client, is detected (e.g., by receiving a probe request). As another example, a wireless access point can determine a time window for reducing functionality (e.g., thereby conserving resources) and communicate the time window to client devices. As a further example, the wireless access point can monitor for clients on a low power transceiver (e.g., Bluetooth® low energy, ZigBee®, infrared) while a high power transceiver (e.g., WiFi or other data communication radio) is turned off.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 9 is a block diagram illustrating an example computing system and network in which the present methods and systems can operate.

DETAILED DESCRIPTION

Figure 1:
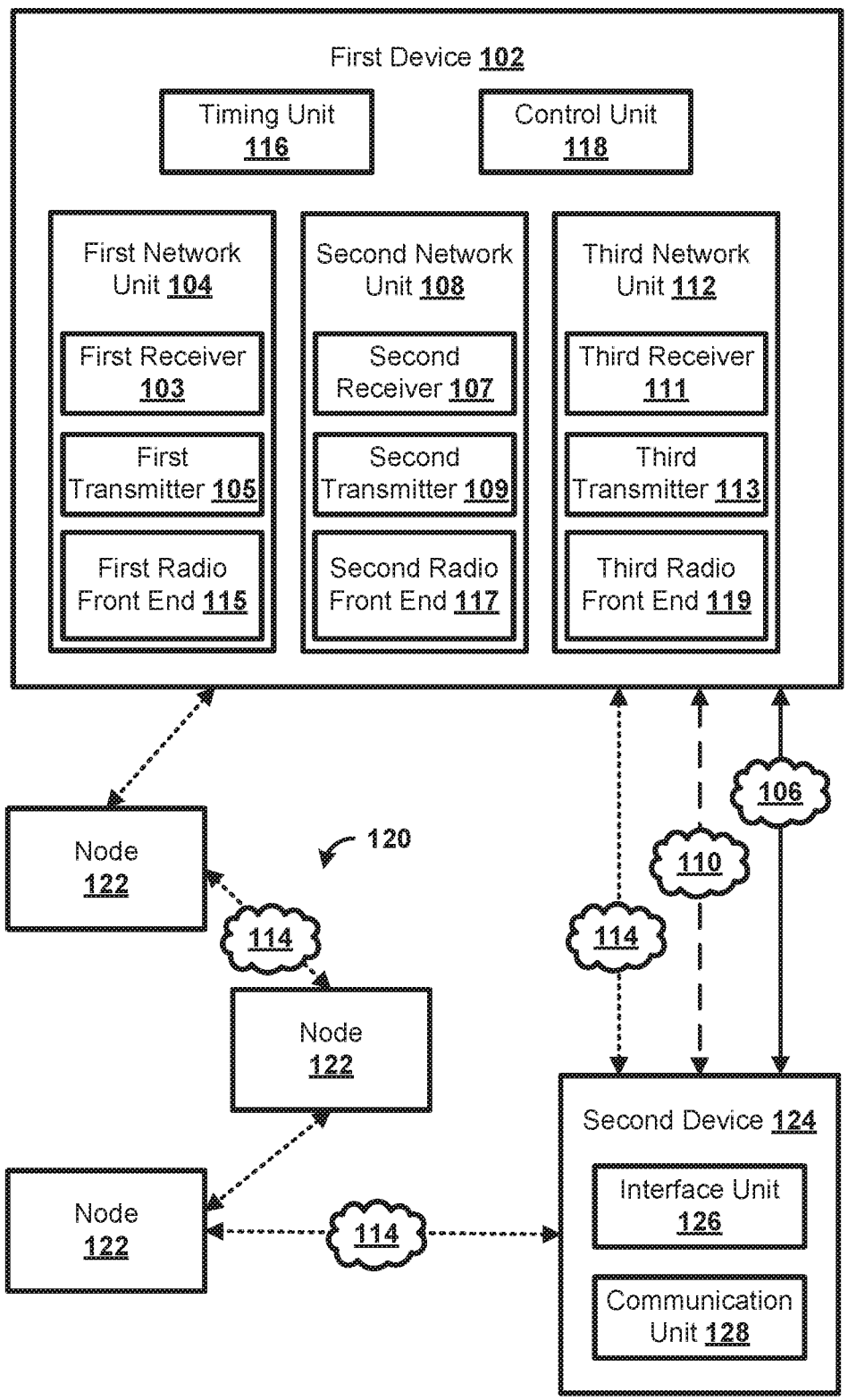
FIG. 1 is a block diagram illustrating an example system architecture.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects.

Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to management of network devices. The present methods and systems allow for intelligent consumption by network devices of resources, such as power, processor availability, data transmissions, memory, and/or the like. For example, network devices can be configured to reduce functionality and to restore functionality to meet an appropriate or desired consumption of resources. Reducing functionality can comprise powering down, reducing power, and/or disconnecting power from a device element, such as a receiver, a transmitter, a radio front end, and/or the like. Reducing functionality can comprise reducing a number of data or signal transmissions, stopping (e.g., preventing, withholding) the transmissions, and/or the like. A network device can reduce functionality based on the absence of active clients, an activity history, schedules (e.g., duty cycle), and/or the like.

As a first example, a network device (e.g., wireless access point) may reduce functionality of a transmitter (e.g., reducing power or periodicity of transmissions of beacons), until a client device is detected, such as when a request, such as a probe request, is received by the network device. As a second example, a network device can determine to reduce functionality (e.g., to conserve resources) during a time window. The network device can notify client devices that the network device will be unavailable or have reduced resources for communication during the time window. Communication between the network device and the client device can resume following the end of the time window.

As a third example, one or more client devices can inform a network device of timeframes during which the client device does not plan to transmit or receive data and/or will not likely be used to transmit/receive data. The client devices can determine the timeframes based on information, such as user preferences, current packet queues, past traffic history, and other device specific information. The network device can collect the information from each client device and determine a timeframe in which all devices will not likely attempt communication (e.g., or where a subset of client devices can, or be caused to delay traffic without much user impact). The network device can reduce or disable communication (e.g., reduce functionality of a receiver and/or transmitter) during the timeframe determined by the network device.

As a fourth example, a network device can power down a first transceiver while allowing a second transceiver to remain powered on. The second transceiver can consume substantially less resources (e.g., power) than the first transceiver, thereby saving resources for the network device. In one implementation, after a client device communicates to the network device via the second transceiver, the network device can restore power and/or functionality to the first transceiver and communicate with the client device via the first transceiver.

FIG. 1 illustrates various aspects of an exemplary system 100 in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In an aspect, the system 100 can comprise a first device 102. The first device 102 can comprise a computing device, such as an access point, such as a wireless access point. The first device 102 can comprise a gateway, router, switch, server, and/or the like. The first device 102 can be located in a user's home, a business premises, a transit location (e.g., a train or bus stop), a recreation area (e.g., a park), and/or the like. For example, the first device 102 can be located in a dense area (e.g., where multiple access points are used to cover the same area) or a remote area (e.g., a park bench, a transit waypoint). The first device 102 can be powered by a power line and/or by internal or external battery power. The first device 102 can be powered by an alternative energy source, such as wind power, solar power, and/or the like.

In an aspect, the first device 102 can comprise a first network unit 104 configured to communicate via a first network 106. For example, the first network 106 can comprise a WiFi network, such as an 802.11 (e.g., 802.11a, b, g, n, ac, ad, af, ah, ai, aj, aq, ax) based wireless network. The first network 106 can comprise a cellular network, such as a 3G, 4G Long Term Evolution (LTE), LTE Advanced, and/or the like. In an aspect, the first network unit 104 can comprise hardware and/or software components for communicating via a first protocol over the first network 106.

For example, the first network unit 104 can comprise a first receiver 103, a first transmitter 105, and/or the like. The first transmitter 105 and/or the first receiver 103 can be configured to be turned off, changed to a reduced functionality mode, and/or the like. As explained further herein, the reduced functionality mode can comprise an operational mode in which a device reduces (e.g., after receiving instructions to reduce) operations, power consumption, and/or the like. For example, the reduced functionality mode can be entered by powering down the first transmitter 105 and/or the first receiver 103, sending a decreased amount of transmissions via the first transmitter 105 and/or the first receiver, relying on a lower power network unit (e.g., a second network unit 108, a third network unit 112) for communication, and/or the like. The first transmitter 105 and the first receiver 103 can comprise elements in common, such as local oscillator circuitry. Thus, powering down both the first transmitter 105 and the first receiver 103 may increase power savings. The first network unit 104 can comprise a first radio front end 115 (e.g., a front end configured for radio frequency communication). The first radio front end 115 can be configured to tune to (e.g., or otherwise select) a specific frequency, a frequency range, and/or the like for receiving and/or transmitting signals. For example, the first radio front end 115 can comprise circuitry (e.g., analog circuitry) between antenna ports and a digital-to-analog converter. In an aspect, multiple first network units 104 can be located in the first device 102. Each of the first network units 104 can comprise one or more corresponding transceiver, radio front end, radio, and/or the like. The first network unit 104 can comprise a software defined radio, a field programmable gate array, an application specific integrated circuit, and/or the like configured to implement the first protocol over the first network 106. In an aspect, the first network unit 104 can comprise multiple antennas. The first network unit 104 can be configured to manage multiple communication streams (e.g., queue, buffer, channel) for simultaneous transmission and/or receiving of separate data to one or more corresponding antennas of the multiple antennas to boost speeds. To enter the reduced functionality mode (e.g., lower power), the first network unit 104 can be configured to reduce the number of antennas that are active, and/or reduce the number of communication streams the first device 102 is transmitting on and/or receiving on via the first network unit 104. The first network unit 104 can be configured to power down or otherwise reduce functionality of other components, such as external power amplifiers, low noise amplifiers, and/or the like of the first network unit 104 for additional power savings.

In an aspect, the first device 102 can comprise a second network unit 108 configured to send and receive information via a second network 110. It should be noted that the first network 106, the second network 110, and a third network 114 are shown using different types of dashed lines to illustrate that different networks may use different communication protocols for transmitting and receiving data. As an illustration, the first network 106 can use a WiFi protocol (e.g., 802.11x), the second network 110 can use a Bluetooth® protocol, and the third network 114 can use another protocol, such as Zigbee®, Z-wave®, an infrared based protocol, and/or the like. For example, the first network 106, the second network 110, and/or the third network 114 can provide communication within corresponding physical areas that at least partially overlap.

As explained herein, the second network 110 can comprise a Bluetooth® network (e.g., Bluetooth® version 1.0, 1.1, 1.2, 2.0, 2.1, 3.0, 4.0, 4.1), such as a Bluetooth® low energy network. In an aspect, the second network unit 108 can be a computing device and/or can comprise hardware and/or software components for communicating via a second protocol over the second network 110. For example, the second network unit 108 can comprise a second receiver 107, a second transmitter 109, and/or the like. The second transmitter 109 and/or the second receiver 107 can be configured to be turned off, changed to a reduced functionality mode, and/or the like. For example, the reduced functionality mode can be entered by powering down the second transmitter 109 and/or the second receiver 107, sending a decreased amount of transmissions via the second transmitter 109 and/or the second receiver 107, relying on a lower power network unit (e.g., a third network unit 112) for communication and/or the like. The second transmitter 109 and the second receiver 107 can comprise elements in common, such as local oscillator circuitry. Thus, turning off both the second transmitter 109 and the second receiver 107 may increase power savings.

The second network unit 108 can comprise a second radio front end 117 (e.g., a front end configured for radio frequency transmissions). The second radio front end 117 can be configured to tune to (e.g., or otherwise select) a specific frequency, a frequency range, and/or the like for receiving and/or transmitting signals. For example, the second radio front end 117 can comprise circuitry (e.g., analog circuitry) between antenna ports and a digital-to-analog converter. In an aspect, multiple second network units 108 can be located in the first device 102. Each of the second network units 108 can comprise one or more corresponding transceiver, radio front end, radio, and/or the like. The second network unit 108 can comprise a software defined radio, a field programmable gate array, an application specific integrated circuit, and/or the like configured to implement the second protocol over the second network 110. In an aspect, the second network unit 108 can be configured to adjust a frequency of a duty cycle (e.g., how often all or a portion of the second network unit 108 is powered off and on). The second network unit 108 can be configured to adjust a transmit power level. In an aspect, the second network unit 108 can be optimized for power saving. For example, the second network unit 108 can be configured to transmit and receive packets quickly (e.g., in comparison to the first network unit 104) in order to maximize the time the circuit elements of the second network unit 108 can be powered down.

In an aspect, the first device 102 can comprise a third network unit 112 configured to send and receive information via a third network 114. For example, the third network 114 can comprise a ZigBee® based network (e.g., based on 802.15.4 or related standard), an infrared communication link, a Z-Wave® based network, and/or the like. In an aspect, the third network unit 112 can be a computing device and/or can comprise hardware and/or software components for communicating via a third protocol over the third network 114. For example, the third network unit 112 can comprise a third receiver 111, a third transmitter 113, and/or the like. The third transmitter 113 and/or the third receiver 111 can be configured to be turned off, changed to a reduced functionality mode, and/or the like. For example, the reduced functionality mode can be entered by powering down the third transmitter 113 and/or the third receiver 111, sending a decreased amount of transmissions via the third transmitter 113 and/or the third receiver 111, and/or the like. The third transmitter 113 and the third receiver 111 can comprise elements in common, such as local oscillator circuitry. Thus, turning off both the third transmitter 113 and the third receiver 111 may increase power savings.

The third network unit 112 can comprise a third radio frequency front end (e.g., radio front end configured for radio frequency transmissions). The third radio frequency front end can be configured to tune to (e.g., or otherwise select) a specific frequency, a frequency range, and/or the like for receiving and/or transmitting signals. For example, the third radio frequency front end can comprise circuitry (e.g., analog circuitry) between antenna ports and a digital-to-analog converter. In an aspect, multiple third network units 112 can be located in the first device 102. Each of the third network units 112 can comprise one or more corresponding transceiver, radio front end, radio, and/or the like. In some scenarios, the third network unit 112 can be configured without a third radio frequency front end. For example, if the third network unit 112 is configured for infrared communication, the third network unit 112 can comprise a light emitting diode, a laser, and/or the like configured to emit infrared, visible light, x-rays, and/or the like. The third network unit 112 can comprise a software defined radio, a field programmable gate array, an application specific integrated circuit, and/or the like configured to implement the third protocol over the third network 114.

In an aspect, the first network 106, when in use, can require consumption of more power than the second network 110, and/or third network 114. Similarly, the first network unit 104 can, when in use, consume more power than the second network unit 108 and/or third network unit 112. For example, the first network 106 can be a high power consuming network in comparison to the second network 110 and/or third network 114. The second network unit 108 can, when in use, consume more power than the third network unit 112. For example, various wireless radios (e.g., transmitter, receiver) can consume different amounts of power, use different types of battery, and/or the like. ZigBee®, Z-Wave®, Bluetooth®, infrared and/or the like radios typically use a smaller battery than the batteries used by WiFi devices. Additionally, ZigBee®, Z-Wave®, Bluetooth®, infrared and/or the like radios typically use less power than WiFi radios.

As an illustration, many devices (e.g., the first device 102, the second device 124) can comprise three or more radios (e.g., receiver, transmitter), such as those comprised in the first network unit 104, the second network unit 108, and the third network unit 112. For example, cell phones can have multiple radios, each radio for communicating via a different protocol, such as 4G long term evolution (LTE), WiFi, and Bluetooth® as well as legacy cellular technologies, such as global system for mobile communication (GSM). Each of the first network unit 104, the second network unit 108, and the third network unit 112 can communicate via different corresponding protocols. Each of the first network unit 104, the second network unit 108, and the third network unit 112 may have a different coverage, speed, and energy consumption profile. In an aspect, an energy consumption profile can comprise operations of the radio associated with corresponding expected (e.g., average) energy consumption to perform the operation. In another aspect, the energy consumption profile can comprise a history of energy consumption. The first network unit 104 can comprise and/or be associated with a first energy consumption profile. The second network unit 108 can comprise and/or be associated with a second energy consumption profile. The third network unit 112 can comprise and/or be associated with a third energy consumption profile. In many devices, the third radio can comprise a Bluetooth®, Bluetooth® low energy, or ZigBee® radio. Thus, the third radio (e.g., third network unit 112) may be the most power efficient in many cases and the best suited for alerting the first device 102 to turn on more data intensive operations.

In another aspect, the first network unit 104, the second network unit 108, and/or the third network unit 112 can each be configured to use the same protocol (e.g., WiFi, Bluetooth®, Zigbee®, infrared) but with different power settings, functionality levels, and/or the like. For example, the first network unit 104 can be configured with a first power setting. The second network unit 108 can be configured with a second power setting. The third network unit 112 can be configured with a third power setting. The first power setting can be associated with a first functionality level, a first power consumption level, and/or the like. The second power setting can be associated with a second functionality level, a second power consumption level, and/or the like. The third power setting can be associated with a third functionality level, a third power consumption level, and/or the like. For example, the first network unit 104 can be configured for enhanced functionality. The second network unit 108 can be configured for default functionality. The third network unit 112 can be configured for reduced functionality. The second network unit 108 can consume less power than the first network unit 104. The third network unit 112 can consume less power than the first network unit 104 and/or the second network unit 108.

In an aspect, the first device 102 can comprise a timing unit 116. For example, the timing unit 116 can be configured to determine first timing information. The first timing information can comprise a time window, start time, stop time, duration of time, and/or the like. The first timing information can be related to one or more devices, protocols, and/or the like. For example, the first timing information can specify a time for reduced functionality, default functionality, enhanced functionality, and/or the like of a device. For example, the first timing information can specify a time for reduced functionality of one or more of the first network unit 104, the second network unit 108, and the third network unit 112. As explained in more detail herein, reduced functionality can comprise reducing transmissions, stopping transmissions, reducing power, enabling a power saving mode (e.g., "sleep mode") or reduced functionality mode, disconnecting power from a portion of the first device 102, and/or the like.

In an aspect, the timing unit 116 can determine the first timing information based on a triggering condition. The triggering condition can comprise an occurrence of a predefined time, a receipt of data, an occurrence of an event, and/or the like. The timing unit 116 can comprise a data store (e.g., database, file) that associates triggering conditions with corresponding timing information, functionality information, and/or the like. The functionality information can specifyr a level of functionality (e.g., reduced, normal, enhanced), hardware (e.g., receiver, transmitted, radio frequency front end) to apply the level of functionality, power levels, configuration settings (e.g., a software setting, on/off of a circuit element), and/or the like. The timing unit 116 can detect the triggering condition and determine the first timing information by selecting the timing information that is associated with the triggering condition in the data store. In an aspect, the triggering condition can comprise receiving a message from a second device 124 (e.g., client device). The message can comprise a request, such as a probe request, a status request, and/or the like. An example probe request can be a 802.11x based probe request. The probe request can comprise a frame structure. The frame structure can comprise a media access control (MAC) header, a frame body, and/or a frame check sequence. The MAC header can be of a fixed length. The MAC header can comprise frame control information, destination information, source information, type information, length information, and/or the like. The frame body can be a variable length. The frame body can comprise a service set identity (SSID), one or more data rates supported by the second device 124, and/or the like. For example, the SSID can be associated with a service (e.g., data service, access to a network connection) provided by the first device 102. The second device 124 may have the SSID in local storage due to a prior communication from the first device 102. As explained further herein, the second device 124 can comprise a client device, user device, mobile device, smart device, computing device, and/or the like. As another example, the SSID can be received from a network management device, programmed as configuration information (e.g., default configuration information), and/or the like.

In an aspect, the request can be based on a wireless protocol, such as a WiFi protocol (e.g., 802.11 based protocol), any protocol mentioned herein, and/or the like. The message can request a response from the first device 102. The message can be configured to determine whether the first device 102 is within range for communication. In an aspect, the message can specify second timing information associated with the second device 124. The timing unit 116 can determine the first timing information based on the second timing information received from the second device 124. For example, the second timing information can specify a time for reduced functionality, default functionality, and/or enhanced functionality of the second device 124. The first timing information can be set as the same as the second timing information or otherwise be calculated based on the second timing information. For example, start times, end times, time durations, periodicity and/or other information related to reduced functionality, default functionality, and/or enhanced functionality can be set by identifying corresponding information in the second timing information. As another example, an offset can be determined and added to or subtracted from the second timing information to determine the first timing information. The first timing information and the second timing information can be set as the same to synchronize the first device 102 and the second device 124. The first timing information and the second timing information can be different by an offset to synchronize the first device 102 and the second device 124. For example, the second timing information can be relevant to and/or determined by the second device 124. The second timing information can be determined in the same or similar way as the first timing information (e.g., except determined by the second device 124). As another example, the second device 124 can determine the second timing information based on a power setting (e.g., selected by a user), a current power level (e.g., percentage of power remaining), a predicted time before a next battery recharge, a device power capacity, and/or the like. As an illustration, if the first device 102 receives a probe request (or other status request), then the timing unit 116 can determine the first timing information by selecting timing information in the data store associated with receiving a probe request. The selected timing information can comprise a time (e.g., any time after receiving the probe request) to change (e.g., reduce, enhance) functionality of the first device 102. As a further illustration, when a client device (e.g., the second device 124) currently associated with the first device 102 leaves the communication range of the first device 102, the first device 102 can enter a reduced functionality mode (e.g., turn off beacons or enter power saving mode for certain periods of time). The client device can be determined (e.g., detected) as out of range by the first device 102, for example, when a timeout condition is met. For example, if the client device does not transmit any information within a specified time period, the first device 102 can determine that the client device is out of range. As another example, if the client device does not respond to a message from the first device 102, the first device 102 can determine that the client device is out of range. As a further example, the first device 102 can receive a message from the client device or other device (e.g., service provider controlled device, another access point) that the client device will be or is out of range of the first device 102. It should be noted, that that first device 102 can remain in a default functionality mode (e.g. or enhanced functionality mode) if other client devices are still within range, and/or actively communicating with the first device 102. If, however, no client devices are within range and/or actively communicating with the first device 102, then the first device 102 can enter the reduced functionality mode. When the previously associated client device comes back within range of the first device 102, the client device can send probe requests to attempt to find the first device 102. When the first device 102 (e.g., which may be in "listen only mode," "duty cycle mode." or other reduced functionality mode) receives the probe request, the first device 102 can restore functionality, return to a default or full power mode, and/or the like.

In an aspect, the triggering condition can comprise a current time (e.g., of the first device 102) matching (e.g., being within, past, the same as) a time window. The time window can be defined by a start time and/or start date. The time window can be defined by an end time and/or end date. The timing unit 116 can determine the time window based on an activity history. The activity history can comprise a history of communication, processing, power level, functionality level, and/or the like associated with a device or group of devices, such as the first device 102. For example, the activity history can comprise a time (e.g., a time stamp, start time, end time, duration, etc.) for each activity. The timing unit 116 can determine the time window based on one or more time periods during which a threshold level of activity occurs or does not occur (e.g., no activity, any activity, a number of events, a frequency of events). The timing unit 116 can determine the time window based on one or more time periods during which a threshold level of activity may occur but the activity can be deferred, ignored, and/or the like during the time window. For example, low priority traffic can be delayed for a time period (e.g., a few hundred milliseconds) if such delay allows the first device 102 to remain in reduced functionality for longer periods of time. As a further example, when the first device 102 receives data for transmission, instead of automatically entering into an appropriate functionality mode for transmitting the data, the first device 102 can set a delayed time window for entering into an appropriate functionality mode for transmitting the data.

As an illustration, if no activity occurs from a first time (e.g., 11 pm) to a second time (e.g., 6 am) for a threshold time period, such as a number of days (e.g., 1, 2, 5, 10, 30), then the timing unit 116 can determine a time window (e.g., a recurring time window, such as from X time to Y time on weekdays, weekends, or any day) associated with reduced functionality that begins at the first time and ends at the second time. Thus, if the timing unit 116 detects that the current time of the first device 102 is within the determined time window, then the timing unit 116 can determine a timing window or other portion of the first timing information based on the time window associated with reduced functionality. For example, the timing window of the first timing information can be set as time window associated with reduced functionality. As explained elsewhere herein, in some scenarios, the first device 102 can be configured to transmit a message to one or more remote devices to inform the one or more remote devices not to transmit information to the first device 102 during the time window.

In an aspect, the timing unit 116 can determine the first timing information based on a scheduling protocol, a schedule, and/or the like. The schedule can be defined, for example, by the scheduling protocol. The schedule can specify first timing information for a duty cycle. A duty cycle can be a regularly occurring cycle of maintaining, reducing, and/or enhancing functionality of the first device 102. In an aspect, the scheduling protocol can be configured to specify (e.g., associate, define) the first timing information (e.g., a start time, an end time, a periodicity, time windows) for corresponding wireless protocols, network units (e.g., the first network unit 104, the second network unit 108, the third network unit 112), receivers (e.g., the first receiver 103, the second receiver 107, the third receiver 111), transmitters (e.g., the first transmitter 105, the second transmitter 109, the third transmitter 113), radio front ends (e.g., the first radio front end 115, the second radio front end 117, the third radio front end 119), and/or the like. The scheduling protocol can comprise rules, logical elements, conditions, formulas and/or the like for determining and/or calculating the first timing information. The first timing information can be timing information for providing (e.g., sending, transmitting) a transmission, changing a functionality level (e.g., between reduced, default, and enhanced functionality, to prevent or enable a transmission using a communication protocol, such as a wireless protocol). The scheduling protocol can specify different timing information for use with different communication protocols (e.g., wireless protocols), network units, receivers, transmitters, radio front ends, devices, and/or the like. The scheduling protocol can coordinate functionality levels (e.g., to enable or prevent transmissions) between two or more communication protocols (e.g., wireless protocols), network units, receivers, transmitters, radio front ends, devices, and/or the like. For example, the scheduling protocol can coordinate functionality levels to prevent collisions between transmissions of at least two different communication protocols, network units, transmitters, receivers, radio front ends, devices, and/or the like. The scheduling protocol can also coordinate and/or specify the use of alternate communication protocols when some network units (e.g., wireless radios) have entered reduced functionality mode. For example, the scheduling protocol can specify the use of a lower power consuming radio (e.g., Bluetooth®, Zigbee®) while a higher power consuming radio (e.g., WiFi) is in a reduced functionality mode.

In an aspect, the scheduling protocol can be incorporated into one or more communication protocols, such as wireless protocols. The scheduling protocol can provide the timing information (e.g., first timing information, second timing information) to the one or more communication protocols (e.g., within a device or from one device to another). The scheduling protocol can provide the first timing information to a device (e.g., the first device 102, the second device 124, the nodes 122). The device can use the timing information to override or replace timing information of a communication protocol. The device can delay transmission from one or more communication protocols based on the timing information provided by the scheduling protocol.

As an illustration, a plurality of devices (e.g., the first device 102, the second device 124, the nodes 122) can be located on or proximate to a premises (e.g., a home, a business). The scheduling protocol can be configured to specify various times entering reduced functionality, restoring functionality, enhancing functionality and/or the like for the plurality of devices. For example, the scheduling protocol can specify timing information for reduced functionality for a first portion of the plurality of devices. A second portion of the plurality of devices can remain at current functionality levels. The scheduling protocol can specify timing information for reduced functionality based on device, category (e.g., device category, communication category), priority (e.g., device priority, communication category), communication protocol, location, activity history (e.g., device is expected to be inactive for a period of time). For example, the first portion of the plurality of devices can belong to a first category, such as automation devices, entertainment devices, and/or the like. The second portion of the plurality of devices can belong to a second category, such as security devices (e.g., sensor nodes). The first portion of the plurality of devices can have a lower priority than the second portion of the plurality of devices. The first portion of the plurality of devices can have a higher inactivity level than the second portion of the plurality of devices.

As an illustration, several examples are given for use of the scheduling protocol. A thermostat can enter a reduced functionality mode, while a door sensor can remain functioning at a current functionality level (e.g., default functionality). A door sensor for a basement door can enter reduced functionality mode, while a door sensor for a commonly used front door can remain functioning at the current functionality level. A wireless access point (e.g., or any other device) can enter a reduced functionality mode if the wireless access point has been inactive for a period of time. The wireless access point can use the scheduling protocol to schedule transmissions on a Bluetooth® or Zigbee® radio while a WiFi radio transmitter is turned off After detecting opening of a door, a door sensor can determine, using the scheduling protocol, that the wireless access point is in a reduced functionality mode. The door sensor can determine, using the scheduling protocol, that the wireless access point is currently accessible via a lower power radio (e.g., Bluetooth®, Zigbee®).

The scheduling protocol can account for at least a portion (e.g., or all) of the plurality of devices and coordinate reduction of functionality between the devices. For example, timing information for reduced functionality (e.g., or restored functionality) can be communicated by a central device (e.g., access point, gateway), timing information for reduced functionality can be communicated by self-reporting (e.g., each device communicates its expected timing information for reducing, restoring, or enhancing functionality to all or neighboring), and/or the like. As another example, timing information may not be communicated among the plurality of devices but can be coordinated through the use of pre-determined rules, conditions (e.g., network conditions, such as presence of different devices, traffic), logical elements, and/or the like of the scheduling protocol.

In an aspect, the first device 102 can comprise a control unit 118 configured to control functionality of the first device 102. For example, the control unit 118 can be configured to control the level of functionality of the first device 102. For example, the level of functionality can comprise reduced functionality, default functionality, enhanced functionality, and/or the like. The control unit 118 can control the level of functionality based on a condition being met, such as the occurrence of a triggering condition. For example, the control unit 118 can change the level of functionality upon receiving a request, upon detecting presence of a device, upon failing to detect presence of a device (e.g., or any device), and/or the like. The control unit 118 can control the level of functionality based on timing information, such as the first timing information. For example, the control unit 118 can change the level of functionality according to a start time, end time, time duration, periodicity, and/or the like defined, specified, identified, and/or the like in the timing information.

In an aspect, the control unit 118 can be configured to reduce functionality of the first device 102. Reducing functionality can comprise reducing (e.g., decreasing frequency of) transmissions, stopping transmissions, and/or otherwise preventing transmissions from the first device 102 (e.g., while a power source is disconnected or connected or while on backup battery power). Reducing functionality can comprise only receiving transmission (e.g., without transmitting), receiving transmission during specified time periods, and/or the like. For example, reducing functionality can comprise enabling or disabling a software setting, enabling or disabling hardware of the first device 102, and/or the like. Default functionality can comprise a standard operational mode set by a user, a manufacturer, a service provider, and/or the like. For example, the default functionality can rely on transmission times specified by known communication protocols. Enhanced functionality can comprise an operational mode that prioritizes performance (e.g., minimizing latency, maximizing data transfer speeds, maximizing interoperability and access to services) over power savings. An example software setting can comprise a power usage level, a power source, a power mode, one or more settings (e.g., thresholds) specifying amounts of functionality (e.g., power usage) to use when certain conditions occur, and/or the like.

In an aspect, reducing functionality of the first device 102 can comprise reducing power to at least a portion of the first device 102 (e.g., the first network unit 104, the second network unit 108, the third network unit 112, or portions thereof). Reducing functionality of the first device 102 can comprise disconnecting at least a portion of the first device 102 (e.g., the first network unit 104, the second network unit 108, the third network unit 112, or portions thereof) from a power source.

For example, all or a portion of a circuit (e.g., a field programmable gate array, an application specific integrated circuit) of the first device 102 can be disconnected from a power source, or power may be reduced. Reducing functionality of the first device 102 can comprise reducing power to, disconnecting power from (e.g., powering down), and/or the like, all or a portion of the first receiver 103, the second receiver 107, and/or the third receiver 111. Reducing functionality of the first device 102 can comprise reducing power to, disconnecting power from (e.g., powering down), and/or the like, all or a portion of the first transmitter 105, the second transmitter 109, and/or the third transmitter 113. Reducing functionality of the first device 102 can comprise reducing power to, and/or disconnecting power from the first radio front end 115, the second radio front end 117, the third radio front end 119, and/or the like. Reducing power can comprise any technique to optimize power usage by the first device 102, such as lowering the amount of time that the first device 102 uses to transmit, receive, be in a default power mode, and/or the like.

In an aspect, the control unit 118 can be configured to reduce functionality to the first network unit 104 (e.g., the first transmitter 105, the first receiver 103), while maintaining functionality to the second network unit 108 (e.g., the second transmitter 109, the second receiver 107) and/or the third network unit 112 (e.g., the third transmitter 113, the third receiver 111). For example, after failing to detect any devices within a coverage area of the first device 102, the control unit 118 can power down the first network unit 104 while maintaining power to the second network unit 108 and/or third network unit 112. Other triggering conditions, timing information, or activity history can be used as a basis for determining to reduce functionality to the first network unit 104. For example, a variety of scenarios, such as those illustrated in FIG. 2 through FIG. 6 and described elsewhere herein can provide a basis for reducing, maintaining, restoring, or enhancing functionality to the first network unit 104, the second network unit 108, and/or the third network unit 112.

In an aspect, the control unit 118 can be configured to restore (e.g., enhance from a reduced state to a prior state or default state) functionality of the first device 102. Restoring functionality can comprise increasing (e.g., increasing frequency of) transmissions, starting transmissions, and/or otherwise allowing transmissions from the first device 102. For example, restoring functionality can comprise enabling or disabling a software setting, enabling or disabling hardware of the first device 102, and/or the like.

Restoring functionality of the first device 102 can comprise increasing power, from a lower power (e.g., no power) to a prior higher power or default power, to at least a portion (e.g., the first network unit 104, the second network unit 108, the third network unit 112, or portions thereof) of the first device 102. Restoring functionality of the first device 102 can comprise connecting at least a portion (e.g., first network unit 104, the second network unit 108, the third network unit 112, or portions thereof) of the first device 102 to a power source.

For example, all or a portion of a circuit (e.g., field programmable gate array, application specific integrated circuit) of the first device 102 can be connected to a power source. Restoring functionality of the first device 102 can comprise restoring power to, connecting power to (e.g., powering up), and/or the like all or a portion of the first receiver 103, the second receiver 107, and/or the third receiver 111. Restoring functionality of the first device 102 can comprise increasing power to, connecting power to (e.g., powering up), and/or the like all or a portion of the first transmitter 105, the second transmitter 109, and/or the third transmitter 113. Restoring functionality of the first device 102 can comprise increasing power to, and/or connecting power from the first radio front end 115, the second radio front end 117, the third radio front end 119, and/or the like.

In an aspect, the system 100 can comprise a mesh network 120. The mesh network 120 can comprise a plurality of nodes 122, such as sensor nodes (e.g., door sensor, temperature sensors, window sensors, motion sensors, humidity sensors, cameras), access points, gateways, user devices, and/or the like. The mesh network 120 can comprise a ZigBee® network, a Bluetooth® network, a Z-Wave® network, and/or the like. For example, the second network 110 and/or third network 114 can comprise the mesh network 120. In an aspect, the first device 102 can be communicatively coupled with one or more nodes 122 of the mesh network 120. For example, the first device 102 can be a node in the mesh network 120.

One or more (or each) of the plurality of nodes 122 can be configured to communicate directly with other nodes 122 within range. As an example, a node 122 of the mesh network 120 can receive a transmission from a device (e.g., second device 124). One or more of the plurality of nodes 122 can relay (e.g., send from one node to another) the transmission to nearby nodes 122 (e.g., until the transmission reaches the first device 102). For example, the node 122 of the plurality of nodes 122 can relay the transmission directly to the first device 102 and/or relay the transmission to one or more intermediate nodes 122 within the mesh network 120, which can further relay the transmission to the first device 102. As a further example, though not shown, it is contemplated that the nodes 122 can be configured to communicate via one or more of the first network 106, the second network 110, and the third network 114. For example, the mesh network 120 is shown separately only for purposes of illustration.

The mesh network 120 can be a backup network, a secondary network, a failover network, and/or the like for a primary network, such as the first network 106. The mesh network 120 can be a low power network in comparison to the first network 106 and/or second network 110. For example, the plurality of nodes 122 can consume less power to send, receive, and/or otherwise process data via the mesh network 120 than is typically used to send, receive, and/or otherwise process the same or similar data on another network, such as the first network 106 or the second network 110. In an aspect, the first device 102 can be configured to reduce or stop operations (e.g., sending, listening, receiving, probing) on the first network 106 and/or second network 110 during a reduced functionality mode. The first device 102 can maintain communication with the mesh network 120 during the reduced functionality mode. After receiving a transmission (e.g., indicating presence) from another device, such as the second device 124, via the mesh network 120, the first device 102 can return to default functionality, restore functionality, enhance functionality, and/or the like. For example, the first device 102 can begin operating the first transmitter 105 and/or first receiver 103 in order to send a transmission or wait for a transmission from the second device 124 via the first network 106.

As an illustration, the control unit 118 can be configured to reduce functionality of the first network unit 104 while allowing the second network unit 108 and/or the third network unit 112 to remain functioning (e.g., at enhanced, reduced, or default mode). The first device 102 can receive a transmission via the second network unit 108 and/or the third network unit 112. For example, the first device 102 can receive a transmission relayed via one or more nodes 122 of the mesh network 120. The transmission can originate from a device, such as the second device 124. The transmission can comprise a message, a request (e.g., probe request), a notification, and/or the like. After the first device 102 receives the transmission, the control unit 118 can be configured to restore functionality to the first network unit 104. For example, the first device 102 can restore functionality as described herein.

As a further explanation, the first device 102 can be in a reduced functionality mode because no client devices were in range or actively communicating to the first device 102. The first device 102 can otherwise enter reduced functionality mode due to power limitations, scheduling (e.g., from the scheduling protocol described herein), and/or the like. The device providing the transmission may not be within range of the first device 102 via the first network 106, but may be within range of the first device 102 via another network, such as the second network 110 or the third network 114. As a further example, the device providing the transmission can communicate with another device (e.g., node) on the second network 110 and/or third network 114. The device connected to the second network 110 and/or third network 114 can rely, forward, and/or the like the transmission to the first device 102. For example, the device can forward the transmission based on routing data in the transmission, a routing table (e.g., next hop information, final destination information), broadcasting (e.g., to all or a subset of the nodes 122).

In an aspect, the first device 102 can be configured to track the capability of associated devices. The first device 102 can determine that it is associated with a client device (e.g., second device 124) that supports a first protocol (e.g., WiFi) and a second protocol (e.g., ZigBee®). When the client device is outside of the communication range of the first device 102, the first device 102 can reduce functionality of the first network unit 104, which enables communication via the first protocol, while maintaining functionality of the second network unit 108, which enables communication via the second protocol. After the client device becomes re-associated with the first device 102 using the first protocol, the first device 102 can reduce functionality of the second network unit 108 (e.g., if no other client devices associated with the first device 102 are configured to communicate via the second protocol). For example, once the first device 102 restores functionality to the first network unit 104, the first device 102 can reduce functionality to the second network unit 108 (e.g., to save resources, such as power). Alternatively, the first device 102 can continue to operate both the first network unit 104 and the second network unit 108 (e.g., in a default or enhanced functionality mode).

In an aspect, the system 100 can comprise one or more of a second device 124. The second device 124 can comprise a client device, such as a user device. The second device 124 can be configured to provide content, services, information, applications, and/or the like to one or more users. For example, the second device 124 can comprise a computer, a smart device (e.g., smart phone, smart watch, smart glasses, smart apparel, smart accessory), a laptop, a tablet, a set top box, a display device (e.g., television, monitor), a digital streaming device, a proxy, a gateway, a transportation device (e.g., on board computer, navigation system, vehicle media center), a sensor node, and/or the like.

In one aspect, the second device 124 can comprise an interface unit 126 configured to provide an interface to a user to interact with the second device 124 and/or remote devices, such as the first device 102. The interface unit 126 can be any interface for presenting and/or receiving information to/from the user, such as user feedback. An example interface can comprise a content viewer, such as a web browser (e.g., Internet Explorer®, Mozilla Firefox®, Google Chrome®, Safari®, or the like), a media player, an application (e.g., web application), and/or the like. Other software, hardware, and/or interfaces can be used to provide communication between the user and one or more of the second device 124 and the first device 102.

In an aspect, the second device 124 can comprise a communication unit 128. A plurality of devices such as computing device 124 can be deployed, individually or in groups. As an example, the communication unit 128 can request or query various files from a local source and/or a remote source. As a further example, the communication unit 128 can transmit to and/or receive data from a local or remote device, such as the first device 102. The communication unit 128 can comprise hardware and/or software to facilitate communication. For example, the communication unit 128 can comprise one or more of a modem, a transceiver (e.g., wireless transceiver), a digital-to-analog converter, an analog-to-digital converter, an encoder, a decoder, a modulator, a demodulator, a tuner (e.g., QAM tuner, QPSK tuner), and/or the like. The communication unit 128 can comprise one or more transceivers (e.g., transmitter, receiver). For example, the communication unit 128 can comprise a WiFi transceiver, a Bluetooth® transceiver, a ZigBee® transceiver, an Infrared transceiver, and/or the like. As a further explanation, the communication unit 128 can comprise the same or similar features described herein for the first network unit 104, second network unit 108, and/or third network unit 112 of the first device 102.

Though not shown, it is contemplated that the second device 124 can also be configured with the same or similar features as described for the timing unit 116 and the control unit 118 of the first device 102. For example, the second device 124 can be configured to determine timing information (e.g., the second timing information) in a similar manner as the first device 102. The second device 124 can be configured to reduce and restore functionality of the second device 124 in a similar manner as the first device 102. As an illustration, the second device 124 can receive a message comprising timing information (e.g., the first timing information), such as a time window, from other devices, such as the first device 102. The second device 124 can reduce functionality during the time window (e.g., while the first device 102 has reduced functionality). Furthermore, the second device 124 can send messages indicating timing information (e.g., the second timing information) associated with reduced functionality of the second device 124. The second device 124 can reduce functionality in a similar manner as the first device 102. The second device 124 can reduce functionality of at least a part of the communications unit 128. For example, the second device 124 can reduce power consumption (e.g., power down, power off, disconnect power, enter reduce power consumption mode) of a transmitter, a receiver, a radio front end, a processor, a portion of the second device 124 (e.g., a portion of a circuit), and/or the like. The second device 124 can return to default functionality after the time window. Similar to the first device 102, the second device 124 can be configured to restore functionality by restoring power (e.g., or increasing power) to any portion of the communication unit 128, the transmitter, the receiver, the radio front end, the processor, the portion of the second device 124, and/or the like.

The following are several illustrations regarding implementation of the system 100. It should be noted that, though specific devices are mentioned for purposes of illustration, it is contemplated that the disclosed examples can be performed by any computing device, such as a network device. An example system can comprise one or more devices, such as a wireless access point, a computing station, a television, a streaming device, a mobile device, and/or a plurality of sensors. The plurality of sensors can comprise a door sensor, a motion sensor, a temperature sensor, a humidity sensor, an utility usage sensor (e.g., water usage, electricity usage). The devices in the system can be assigned a plurality of corresponding priorities. The priorities can be dynamic, or vary over time. For example, the wireless access point can enter a reduced functionality mode (e.g., only) when no transmissions are expected from the door sensor and/or motion sensor (e.g., which may have a higher priority). The wireless access point can enter the reduced functionality mode even though transmissions are expected from the temperature sensor, the humidity sensor, and/or the utility usage sensor. When the wireless access point is in the reduced functionality mode, the wireless access point can have a WiFi radio turned off while maintaining a Zigbee® radio. The utility usage sensor can continue to send packets or withhold sending packets (e.g., if the utility usage sensor determines the wireless access point is currently in reduced functionality mode based on a duty cycle or notification). Meanwhile, the door sensor can unexpectedly detect the opening of a door. The door sensor can transmit data indicative of the door opening using WiFi and receive no response from the wireless access point (e.g., because its WiFi radio is turned off). The door sensor can then retransmit the data using a Zigbee® radio. The transmission can be picked up by the temperature sensor and be retransmitted (e.g., broadcast) using Zigbee® and/or Bluetooth®. The mobile device can receive the Bluetooth® transmission and relay the Bluetooth® transmission to the wireless access point, which may return to default functionality mode for further communication with the door sensor or other devices. For example, the wireless access point can send a transmission to notify the motion sensor to enter default or enhanced functionality modes (e.g., if the motion sensor was in reduced functionality mode). The wireless access point can notify a video camera to enter default or enhanced functionality mode and begin obtaining video (e.g., increasing the frequency of taking pictures).

As another example, the wireless access point can be deployed at a train station. Using the expected train schedule (e.g., or real time tracking of trains), the wireless access point can enter reduced functionality mode based on a prediction of when the lowest number of users will want to access the wireless access point. For example, the wireless access point can enter reduced functionality mode after a train is boarded at the train station. The wireless access point can listen for Bluetooth® connections while in reduced functionality mode. A passenger having a mobile device with a Bluetooth® connection can communicate with the wireless access point via a Bluetooth® radio while the wireless access point is in reduced functionality mode.

As another example, the wireless access point (e.g., or other device) can broadcast to all nearby devices (e.g., the plurality of sensors, streaming media device, television) that the wireless access point is in a reduced functionality mode. The receiving devices can decide to enter reduced functionality mode (e.g., in response to receiving transmission) or continue to operate normally. The streaming media device can receive a request from a user to access content. The streaming media device can indicate that the wireless access point is in reduced functionality mode and provide options for locally stored content. The user can instruct the streaming media device to override the reduced functionality mode. The streaming media device can send an instruction, via Bluetooth® or Zigbee® (e.g., or physical Ethernet connection), to the wireless access point to return to default functionality mode or enhanced functionality mode (e.g., for high data throughput to support high definition or ultra-high definition media). Upon receiving the instruction, the wireless access point can return to default functionality mode or enter enhanced functionality mode.

As another example, the wireless access point (e.g., or other device) can enter a reduced functionality mode by turning off a transmitter while leaving on at least one receiver. The wireless access point can receive a plurality of transmissions while in the reduced functionality mode. The wireless access point can store the data from the plurality of transmissions in a queue or other network flow and wait to process (e.g., respond, forward) all or a portion of the data until the wireless access point returns to default functionality mode. In some scenarios, the wireless access point can perform an initial analysis to determine if the data is above a threshold priority. If so, then the wireless access point can return to default functionality mode or selectively process the data using alternate routes (e.g., lower power radio). As a further example, the wireless access point can temporarily turn on a transmitter to process a higher priority packet while allowing a receiver to remain turned off.

As another example, the streaming media device (e.g., or television, mobile device) can proactively download additional media (e.g., video, audio) predicted as relevant to the user. When the additional media is downloaded to the streaming media device, the streaming media device can instruct the wireless access point to enter a reduced functionality mode. In an another aspect, the streaming media device can download the additional media in advance of a reduced functionality window determined by a duty cycle of the wireless access point. The streaming media device can learn the duty cycle over time or receive notice of the duty cycle from the wireless access point.

As another example, a wireless access point (e.g., or other device) can enter a reduced functionality mode by turning off a WiFi transmitter and while maintaining operation of a WiFi receiver. As no beacons advertising an SSID of the wireless access point are sent, a mobile device (e.g., or other device) attempting to communicate with the wireless access point can send a probe request. The probe request can identify the SSID of the wireless access point. Upon receiving the probe request, the wireless access point can return to default functionality mode to communicate with the mobile device.

Figure 2:
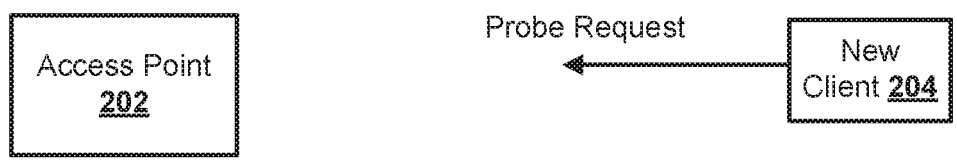
FIG. 2 is a block diagram illustrating communication between network devices.

FIG. 2 is a block diagram illustrating communication between an access point 202 and a wireless device 204 (e.g., a client device). A wireless device 204 that is or was previously connected to the access point 202 can be configured to actively scan for the access point 202 by sending a probe request (e.g., probe request frame). Otherwise, the wireless device 204 can perform scanning purely passively by listening for beacons from the access point 202. The probe requests sent by a wireless device 204 can comprise information, such as one or more SSIDs identifying one or more access points 202 to which that the wireless device 204 wishes to connect. For example, the client device 205 can be configured to store a prior communication history comprising one or more SSID's used to communicate with and/or identify the access point 202. The probe request can comprise a message configured to determine whether the access point identified by the SSID is available for communication.

In an aspect, the present methods and systems can utilize probe requests for communication with an access point 202 when the access point is in a reduced functionality mode. For example, the access point 202 can turning off a wireless transmitter of the access point 202 when no wireless device 204 is currently connected and/or within range of the access point 202. When no wireless device 204 is in the area, the access point 202 can simply turn off its wireless transmitter and listen for probe request frames from a wireless device 204. The wireless device 204 may wirelessly transmit (e.g., broadcast) probe requests (e.g., directed to the access point 202) when the wireless device 204 returns to the coverage area of the access point 202. When an access point 202 receives a probe request, the access point 202 can turn on the wireless transmitter of the access point 202, thereby returning to full power operation. The access point 202 can then communicate with the wireless device 204 via the wireless transmitter.

Figure 3:
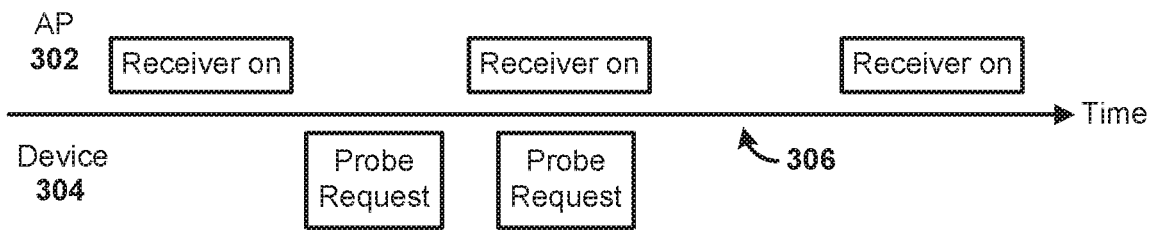
FIG. 3 is a sequence diagram illustrating communication between network devices.

FIG. 3 is a sequence diagram illustrating communication between an access point 302 and a device 304 over time. Actions performed by the access point 302 are shown above the timeline 306, and actions performed by the device 304 are shown below the timeline 306. In some scenarios, the access point 302 can be configured to perform activities with a receiver based on a duty cycle. The duty cycle can comprise a regular and/or reoccurring interval during which an activity is performed. For example, the access point 302 can monitor, listen, and/or the like for probe requests at limited times according to the duty cycle. As another explanation, the duty cycle can specify a repeated time cycle for reducing functionality (e.g., powering down) of a receiver, transmitter, and/or other component of the access point. For example, FIG. 3 shows that the access point 302 operates a receiver according to a duty cycle. The receiver is shown is "on" at regularly according intervals along the time line. The length and periodicity of the on windows and/or off windows can be specified by the duty cycle. In such a scenario, additional time may pass when the device 304 re-enters a coverage area (e.g., communication range) of the access point. For example, when the device 304 enters the coverage area of the access point, the device 304 can begin transmitting probe requests to the access point 302. As shown in FIG. 3, the access point 302 may be in reduced functionality mode (e.g., powered down) and thus be unable to transmit a response and/or receive the probe requests when the first probe request is provided by the device 304. The device 304 can repeat transmission of probe requests until a probe request is transmitted during the access point's 302 (e.g., or receiver's thereof) "on" window (e.g., default functionality mode) as defined by the duty cycle.

Listening for probe requests and/or controlling the functionality mode based on a duty cycle can allow the access point 302 to save power by not sending out beacons at various times (e.g., at least while no devices are connected) and/or not listening to transmission, such as probe requests. Since beacons are sent at the lowest modulation level, beacons take a considerable amount of airtime for the amount of data that is sent. By not sending beacons while the access point 302 is within the off window of the duty cycle, other wireless devices (e.g., ZigBee® devices, other APs) in the area will have more airtime available for sending transmissions that often utilize the same radio spectrum.

Figure 4:
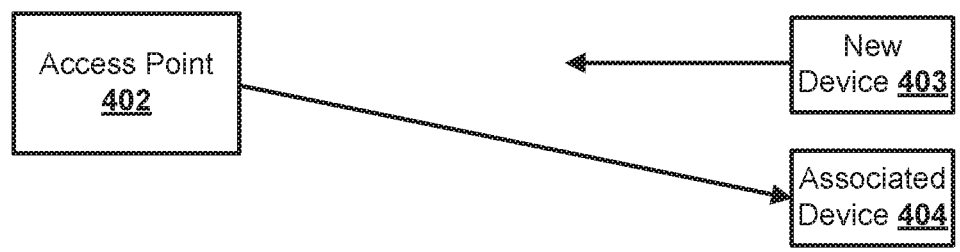
FIG. 4 is a block diagram illustrating communication between network devices.

FIG. 4 is a block diagram illustrating communication between an access point 402 and a device 404. When a new device 403 (e.g., new user and/or client device) communicates with the access point 402, the new device 403 can become associated with the access point 402. The devices 404 (e.g., user and/or client devices) associated with the access point 402 may be connected to the access point 402 but not currently transferring data. In such scenarios, the access point 402 can attempt to put one or more of the devices 404 associated with the access point 402 into a reduced functionality mode (e.g., power saving mode, sleep mode). For example, the access point 402 can inform currently inactive devices 404 to reduce functionality, enter the reduced functionality mode (e.g., go to sleep), and/or the like. The access point 402 can provide the message via a current communication session with the devices 404, via a communication channel (e.g., known, specified, predetermined). The present methods and systems can comprise a new protocol that configures an access point 402 to query currently connected devices 404 that are not transmitting (e.g., or receiving) data, to determine if the devices 404 are likely to transmit data in the next timeframe. The devices 404 may inform the access point 402 that the devices 404 will not transmit or otherwise require a connection for that timeframe(s), at which point the access point 402 can go to sleep, and repeat the process. The access point 402 can collect the timeframes from the devices 404 and determine an updated timeframe during which none of the devices 404 will transmit or need a connection. The access point 402 can enter reduced functionality mode during the updated time frame.

In another aspect, the access point 402 can select a timeframe for the access point 402 to enter reduced functionality mode and inform the devices 404 when the access point 402 will return to the prior mode, such as a default functionality mode. The devices 404 can be configured to enter a reduced functionality mode at the same time as the access point 402, also saving the power of the devices 404. In another aspect, the devices 404 can be configured to gather, collect, and/or otherwise receive data (e.g., in a buffer) during the time when the access point 402 is in the reduced functionality mode. After the access point 402 returns to the prior mode, then the devices 404 can transmit the data to the access point 402.

In an aspect, the access point 402 can be configured to disable and/or turn off the reduced functionality mode (e.g., power savings mode) based on user input, such as movement of a sensor (e.g., accelerometer, tilt sensor), disconnecting or connecting an Ethernet cable, pressing a WiFi Protected Setup (WPS) button (e.g., on the access point 402). The access point 402 can be configured to turn off and/or disable the reduced functionality mode for a time period (e.g., hour) after a modem (e.g., connecting the access point 402 to a wide area network, such as the Internet) is reset. In another aspect, the access point 402 can be configured to use a learning algorithm to determine a pattern of communication behavior. For example, the access point 402 can determine that wireless devices never attempt to associate with the access point 402 between a first time and a second time (e.g., between 1 am and 5 am).

Figure 5:
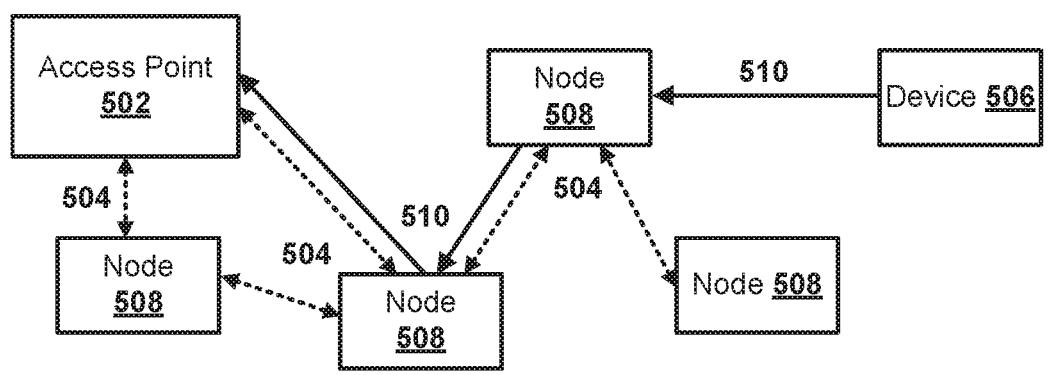
FIG. 5 is a block diagram illustrating communication between network devices.

FIG. 5 is a block diagram illustrating an access point 502 connected to a mesh network 504 (e.g., shown as dashed lines). Many user devices, such as mobile devices, comprise additional low power radios, such as Bluetooth® radios (e.g., Bluetooth® low energy), ZigBee® radios, Z-Wave® radios, and/or the like. The access point 502 can be configured to disable one or more of the access point's 502 first radios (e.g., high power radio, WiFi transmitter and receiver) when not in use and instead listen using the access point's 502 second radio (e.g., low power radio).

When a device 506 (e.g., client device) comes within range of the access point 502, the device 506 (e.g., which was previously associated with the AP) can send a request (e.g., similar to an 802.11 probe request) to join the access point 502 (e.g., only sent via the second radio). The access point 502 can respond to the device 506 (e.g., via a lower power radio), indicating that the device 506 is within range and that the access point 502 will turn on the first radio (e.g., WiFi radio) for communication with the device 506. This approach can result in lower power operation for both the access point 502 and client device 506.

Since the second radio (e.g., low power radio) may not have the range of the first radio (e.g., high power radio), a mesh network 504 of low power radios can be implemented to enable communication. When a device 506 comes within range (e.g., using the device's own lower power radio) of a node 508 in the mesh network 504, the node 508 can relay communication 510 (e.g., shown as a solid line) related to the client device 506 to the access point 502. After the communication is relayed to the access point 502, the access point 502 can turn on the high power radio (e.g., WiFi, 802.11 radio) and communicate with the new device 506 directly. In one aspect, the access point 502 can be instructed to or otherwise determine to turn on the access point's 502 high power radio potentially even before the device 506 comes within range of the high power radio to allow for startup time. For example, the device 506 can send a transmission via a low power radio (e.g., and mesh network 504) to the access point 502 instructing the access point 502 to turn on the high power radio, indicating a time to turn on a high power radio (e.g., time of arrival within range), and/or the like. As another example, the transmission may not indicate or instruct the access point 502 to turn on the high power radio, but the access point 502 can determine after receiving the transmission that the device 506 will be within range of the high power radio of the access point 502 (e.g., within an estimated time period). The access point 502 can make such determination based on which nodes 508 of the mesh network 504 received and/or forwarded the transmission to the access point 502. For example, one or more of the nodes 508 can add data (e.g., a header, a persistent label) to the transmission indicating that the node 508 received and/or forwarded the transmission. The access point 502 can make the determination based on the number of nodes 508 (e.g., number of hopes) that forwarded and/or received that transmission, a distance between one or more nodes 508 of the mesh network 504 (e.g., the first node to receive the transmission, the node that received the transmission directly from the device 502) and the access point 502, a combination thereof, and/or the like.

Figure 6:
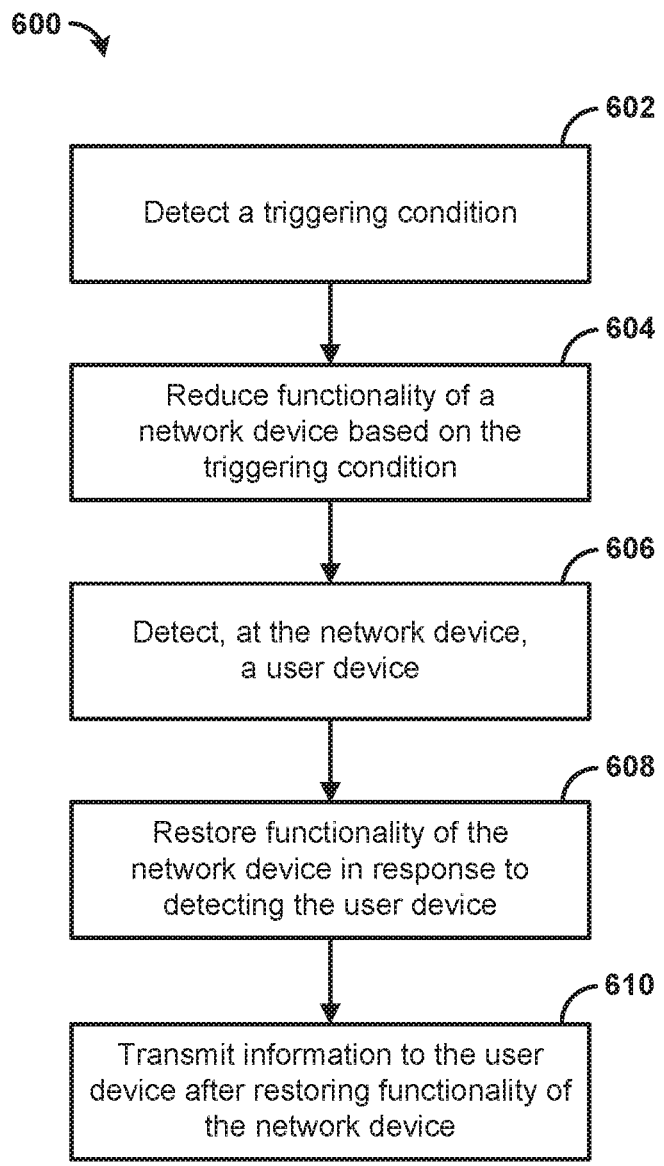
FIG. 6 is a flowchart illustrating an example method.

FIG. 6 is a flowchart illustrating an example method 600 for managing a network device. At step 602, a triggering condition can be detected. For example, the triggering condition can be detected at the network device. The network device can comprise a wireless access point, a gateway, a router, a set top box, a computer, and/or the like. The network device can be a portable network device. For example, the network device can be powered by a battery, a solar cell, a combination thereof, and/or the like. The network device can be located outside of range of an electrical outlet.

In an aspect, detecting the triggering condition can comprise determining that a current time is within a time range associated with reduced functionality. The time range can be selected and/or determined based on activity history, user input, acquired schedules, and/or the like. The activity history can comprise a history of communication, processing, power level, functionality level, transmit and receive history, and/or the like associated with a device, such as the network device. The time period can be based on one or more prior time periods during which a threshold level (e.g., no activity, any activity, a number of events, a frequency of events) of activity occurs or does not occur.

The triggering condition can also comprise a pre-defined time, a receipt of data, an occurrence of an event, and/or the like. In an aspect, the triggering condition can comprise receiving a message from a user device. In another aspect, the triggering condition can be absence of user device activity. Detecting the triggering condition can comprise detecting when no user device activity is detected within a threshold time.

At step 604, functionality of the network device can be maintained, reduced, or increased based on detecting the triggering condition. For example, functionality of a wireless radio of the network device can be reduced based on detecting the triggering condition. Reducing functionality can comprise reducing a number of transmissions, stopping transmissions, powering down a transmitter, powering down a receiver, a combination thereof, and/or the like.

As a further example, reducing functionality can comprise reducing (e.g., decreasing frequency of) transmissions, stopping, and/or otherwise preventing transmissions from the network device (e.g., while the power source is disconnected or connected). For example, reducing functionality can comprise enabling or disabling a software function or setting, enabling or disabling hardware of the network device, and/or the like.

Reducing functionality of the network device can comprise reducing power to at least a portion (e.g., the wireless radio) of the network device. Reducing functionality of the network device can comprise disconnecting at least a portion (e.g., the wireless radio) of the network device from a power source. For example, all or a portion of a circuit (e.g., field programmable gate array, application specific integrated circuit) of the network device can be disconnected from a power source. The wireless radio of the network device can comprise a transceiver, a receiver, a transmitter, and/or the like. Reducing functionality of the network device (e.g., or wireless radio thereof) can comprise reducing power to, disconnecting power from (e.g., powering down), and/or the like, all or a portion of the receiver, all or a portion of the transmitter, all or a portion of the transceiver, and/or the like. Reducing functionality of the network device (e.g., or wireless radio thereof) can comprise reducing power to, and/or disconnecting power from a radio front end associated with the transceiver, the receiver, the transmitter, and/or the like. Reducing functionality of the network device can comprise entering a reduced functionality mode (e.g., power saving mode, sleep mode).

At step 606, a user device (e.g., client device) can be detected at the network device. The user device can comprise a computer, a smart device (e.g., smart phone, smart watch, smart glasses, smart apparel, smart accessory), a laptop, a tablet, a set top box, a display device (e.g., television, monitor), a digital streaming device, a proxy, a gateway, a transportation device (e.g., on board computer, navigation system, vehicle media center), a sensor node, and/or the like. For example, detecting, at the network device, the user device can comprise receiving, at the network device, a request, such as a probe request. The request can be received from the user device, or from a node of a mesh network (e.g., that forwards the request from the user device to the access point). The request (e.g., the probe request) can be configured to determine presence of the network device. For example, the request can be a request for acknowledgement, a request for a connection, a request for a communication session, a request for data, a request to forward data, a combination thereof, and/or the like. As an illustration, the network device can maintain functionality of the receiver of the wireless radio while the network device has reduced functionality. For example, the network device can reduce functionality (e.g., power down, disconnect, reduce transmission) of the transmitter of the wireless radio. The network device can receive the request via the receiver, thereby detecting the user device. As another illustration, the network device can maintain functionality of an additional wireless radio. The additional wireless radio can consume lower power than the wireless radio. The network device can receive the request directly via the additional wireless radio or indirectly via one or more intermediate devices. For example, the one or more intermediate devices can comprise nodes of a mesh network. The one or more intermediate devices can receive the request and relay the request (e.g., via the mesh network) to the network device.

At step 608, functionality of the network device can be restored in response to detecting the user device. For example, functionality of the wireless radio of the network device can be restored in response to detecting the user device. Restoring functionality can comprise increasing a number of transmissions, beginning transmissions, powering up the transmitter, powering up the receiver, a combination thereof, and/or the like.

As a further example, restoring functionality can comprise increasing (e.g., increasing frequency of) transmissions, starting, and/or otherwise allowing transmissions from the network device. For example, restoring functionality can comprise enabling or disabling the software setting, enabling or disabling hardware of the network device, and/or the like.

Restoring functionality of the network device can comprise increasing power to at least a portion (e.g., wireless radio) of the network device. Restoring functionality of the network device can comprise connecting at least a portion (e.g., wireless radio) of the network device to a power source. For example, all or a portion of the circuit (e.g., the field programmable gate array, the application specific integrated circuit) of the network device can be connected to the power source. Restoring functionality of the network device (e.g., or the wireless radio thereof) can comprise increasing power to, connecting power to (e.g., powering up), and/or the like all or a portion of the receiver, all or a portion of the transmitter, all or a portion of the transceiver, and/or the like. Restoring functionality of the network device (e.g., or the wireless radio thereof) can comprise increasing power to, and/or connecting power to the radio front end associated with the transceiver, the receiver, the transmitter, and/or the like. Restoring functionality of the network device can comprise entering a default functionality mode (e.g., default power mode). Default functionality mode can comprise a standard and/or initial operational mode set by a user, manufacturer, service provider, and/or other prior functionality mode of the network device.

At step 610, information can be transmitted to the user device (e.g., via the wireless radio) after restoring functionality of the network device (e.g., wireless radio). The information can comprise a beacon, data transmission, and/or the like. The information can comprise a response (e.g., probe response) to the request from the user device.

Figure 7:
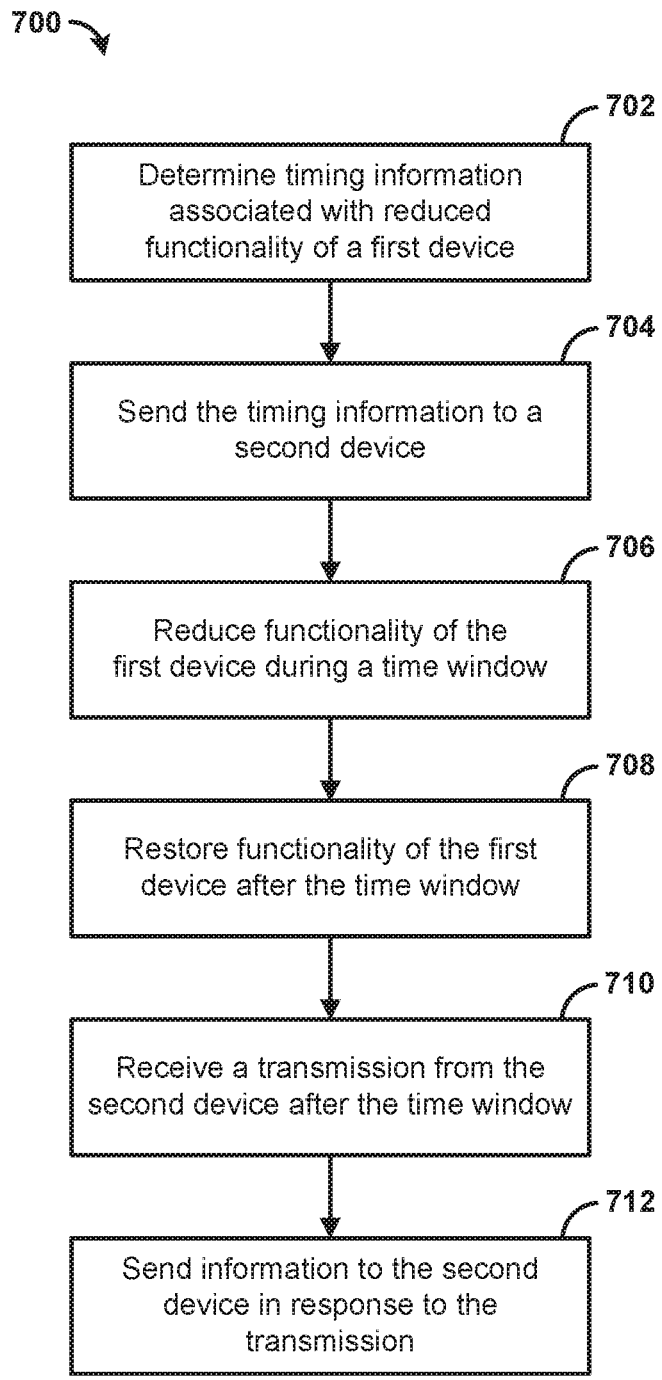
FIG. 7 is a flowchart illustrating another example method.

FIG. 7 is a flowchart illustrating another example method 700 for managing a network device. At step 702, timing information associated with reduced functionality of a first device can be determined (e.g., by the first device). The first device can comprise a wireless access point. The timing information associated with reduced functionality of the first device can comprise a time (e.g., time window) during which the first device plans or is otherwise scheduled to have reduced functionality. For example, the timing information can be indicative of a time window. The timing information can comprise start time and/or end time of the time window. The timing information can comprise a duration time of the time window.

In an aspect, the first device can determine the timing information based on presence and/or absence of a triggering condition. The triggering condition can comprise a pre-defined time, a receipt of data, an occurrence of an event, and/or the like. In an aspect, the triggering condition can comprise receiving a message from a client device. In another aspect, the triggering condition can be absence of client device activity. Detecting the triggering condition can comprise detecting when no client device activity is detected within a threshold time. The triggering condition can comprise a condition that a current time is within a time range associated with reduced functionality. The time period can be based on one or more prior time periods during which a threshold level (e.g., no activity, any activity, a number of events, a frequency of events) of activity occurs or does not occur.

The first device can determine the timing information (e.g., time window) based on an activity history. The activity history can comprise a history of communications, processing, power levels, functionality levels, and/or the like associated with a device, such as the first device. The first device can determine the timing information (e.g., time window) based on one or more time periods during which a threshold level (e.g., no activity, any activity, a number of events, a frequency of events) of activity occurs or does not occur.

In an aspect, determining timing information associated with reduced functionality of the first device can comprise determining a time during which only transmissions below a threshold priority are expected to be received at the first device. As another example, it can be determined that the second device does not meet a threshold priority. For example, the first device can store a hierarchy of devices, priorities associated with devices, and/or the like. Different devices can have different priorities. For example, active devices (e.g., actively controlled by a user, transmitting or receiving with a time window) can have a higher priority than passive devices (e.g., not currently being accessed or controlled by the user, or not transmitting or receiving within a time window). For example, a plurality of sensors can be deployed. One or more of the plurality of sensors can be classified as active devices and/or passive devices depending on recent or current activity and other conditions. The plurality of sensors can comprise temperature sensors, video cameras, humidity sensors, door sensors, window sensors, security sensors, motion sensor, and/or the like. The plurality of sensors can have varying levels of priority. The priority of devices can vary over time based on type of information detected by the sensor, time since last occurrence of conditions detected by the sensor, user settings, activity history, access by a user, and/or the like. As an illustration, the first device can receive periodic updates from a sensor (e.g., the second device can be the sensor in this illustration or another device), such as a humidity or temperature sensor. The first device can determine that the sensor has a priority below a threshold. Then, the first device can determine a time period to enter reduced functionality mode. The time period can be a time period during which the sensor is expected to send a transmission to the first device. Accordingly, the transmission may not be received, or the first device can notify the sensor of the time period so that the sensor will not transmit during the time period.

In another aspect, determining timing information associated with reduced functionality of the first device can comprise determining (e.g., accessing) a schedule for conserving power. The timing information can be based on the schedule for conserving power. The schedule can be periodically updated, set by a user, set by service provider, and/or the like. The schedule can specify a duty cycle for periodically reducing and restoring functionality. The schedule can be specified by a scheduling protocol as further described herein.

Determining timing information associated with reduced functionality of the first device can comprise receiving an instruction from a third device to conserve power, wherein the timing information is based on the instruction. The third device can comprise a user device (e.g., with an application for controlling power settings). The third device can be in a local area network with the first device. For example, the third device can be wirelessly connected to the first device. In another aspect, the third device can be a device controlled by a service provider, such as an upstream device.

At step 704, the timing information can be sent (e.g., provided, transmitted) to a second device (e.g., from the first device). The second device can be a user device that communicates with the first device and, for example, uses the first device to communicate with a local or external network. Sending the timing information to the second device can comprise sending a notification that the first device will be unavailable for communication during the time window. The second device can be configured to disable transmission and/or reception from the second device to the first device during the time window specified by the timing information. The second device can be configured to reduce functionality (e.g., thereby saving power) of the second device during the time window (e.g., in response to receiving the timing information).

At step 706, functionality of the first device can be reduced (e.g., by the first device) during the time window. Reducing functionality can comprise reducing (e.g., decrease frequency of) transmissions, stopping, and/or otherwise preventing transmissions from the first device (e.g., while the power source is disconnected or connected). For example, reducing functionality can comprise enabling or disabling a software setting, enabling or disabling hardware of the first device, and/or the like.

In an aspect, the first device can selectively have power reduced during the time window. For example, the first device can be selected from among a plurality of devices for reduced functionality. A first portion of the plurality of devices can be selected for reduced functionality. A second portion of the plurality of devices can remain at current functionality levels. For example, the first portion of the plurality of devices can belong to a first category, such as automation devices, entertainment devices, and/or the like. The second portion of the plurality of devices can belong to a second category, such as security devices (e.g., sensor nodes). The first portion of the plurality of devices can have a lower priority than the second portion of the plurality of devices. The first portion of the plurality of devices can have a higher inactivity level than the second portion of the plurality of devices. As an illustration, a thermostat can enter a reduced power mode, while a door sensor can remain functioning in the current mode (e.g., default functionality mode). A wireless access point can enter a reduced power mode if the wireless access point has been inactive for a period of time.

Reducing functionality of the first device can comprise reducing power to at least a portion of the first device. Reducing functionality of the first device can comprise disconnecting at least a portion of the first device from a power source. For example, all or a portion of a circuit (e.g., field programmable gate array, application specific integrated circuit) of the first device can be disconnected from a power source. The first device can comprise a transceiver, receiver, transmitter, and/or the like. Reducing functionality of the first device can comprise reducing power to, disconnecting power from (e.g., powering down), and/or the like all or a portion of the receiver, all or a portion of the transmitter, all or a portion of the transceiver, and/or the like. Reducing functionality of the first device can comprise reducing power to, and/or disconnecting power from a radio front end associated with the transceiver, the receiver, the transmitter, and/or the like. Reducing functionality of the first device can comprise entering a reduced functionality mode (e.g., power saving mode, sleep mode).

At step 708, functionality of the first device can be restored (e.g., by the first device) after the time window. Restoring functionality can comprise increasing (e.g., increasing frequency of) transmissions, starting, and/or otherwise allowing transmissions from the first device. For example, restoring functionality can comprise enabling or disabling a software setting or function, enabling or disabling hardware of the first device, and/or the like.

Restoring functionality of the first device can comprise increasing power to at least a portion of the first device. Restoring functionality of the first device can comprise connecting at least a portion of the first device to a power source. For example, all or a portion of a circuit (e.g., field programmable gate array, application specific integrated circuit) of the first device can be connected to a power source. As an illustration, if a user requests transmission of data, or after a time window is over, the portion of the circuit necessary to provide the transmission can be connected to the power source. The first device can comprise a transceiver, a receiver, a transmitter, and/or the like. Restoring functionality of the first device can comprise increasing power to, connecting power to (e.g., powering up), and/or the like all or a portion of the receiver, all or a portion of the transmitter, all or a portion of the transceiver, and/or the like. If a transmission is scheduled to be received, expected to be received, and/or a time window is over, the power can be connected to the receiver. If a transmission is scheduled to be transmitted, expected to be transmitted, and/or a time window is over, the power can be connected to the transmitter. In scenarios where the receiver and transmitter are connected to power via the same switch or setting, both the receiver and transmitter can be connected to power even though only one of the receiver or transmitter is used for an operation (e.g., transmitting, receiving). Restoring functionality of the first device can comprise increasing power to, and/or connecting power to the radio front end associated with the transceiver, the receiver, the transmitter, and/or the like. For example, if receiving or providing an expected transmission requires all or a portion of the radio front end, then all or a portion of the radio front end can be connected to power. For example, power can be connected to one or more antennas, digital-to-analog converters, analog-to-digital converters, and/or other related circuit elements. Restoring functionality of the first device can comprise entering a default power mode. For example, if the first device was last in the default mode before entering lower power mode, then the first device can return to the default power mode.

At step 710, a transmission can be received from the second device (e.g., at the first device) after the time window. For example, the second device can send the transmission in response to the time window being over. For example, the time window can start at a first time (e.g., 1 a.m.). The time window can end at a second time (e.g., 6 a.m.). The time window can be over any time after the second time, such as at a third time (e.g., 6:01 a.m.). The transmission can comprise a probe request, data request (e.g., request for a media stream), and/or the like.

At step 712, information can be sent (e.g., provided, transmitted) to the second device (e.g., from the first device) in response to the transmission. For the example, the information can be sent wirelessly. The information can comprise a beacon, a data transmission, receiving data from the second device, and/or the like. Transmission of the information can be sent via a transceiver, a transmitter, and/or the like whose functionality was restored by restoring functionality of the first device.

In some scenarios, one or more of the steps of the method 700 can be omitted or repeated. For example, the first device can be configured to continuously loop through the method 700. As a further example, after the first device performs step 708, 710, and/or 712, the first device can begin the method 700 again by returning to steps 702, 704, and/or 706.

Figure 8:
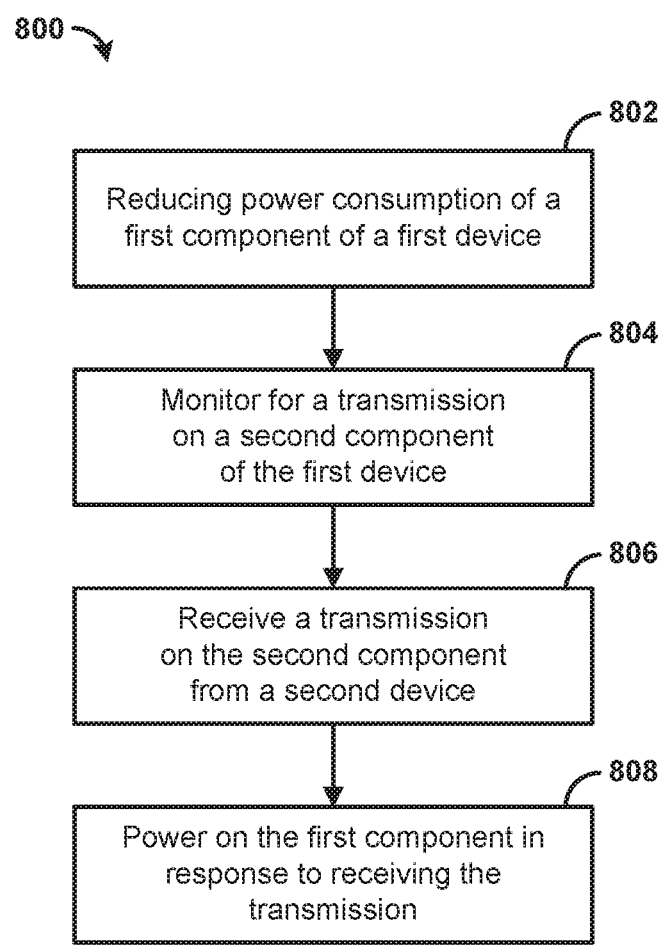
FIG. 8 is a flowchart illustrating yet another example method.

FIG. 8 is a flowchart illustrating yet another example method 800 for managing a network device. At step 802, a first component of a first device (e.g., an access point, client device) can be reduced in power consumption (e.g., be powered) off and/or otherwise reduced in functionality. The first component can be partially powered down, or made to operate in a reduced power state. The component can comprise a transceiver, transmitter, receiver, radio front end, radio, a combination thereof, and/or the like. For example, the first device can comprise a wireless access point, such as an access point for a local area network. As another example, the first device can comprise a user device, client device and/or the like in the local area network. The first device can comprise a computer, a smart device (e.g., smart phone, smart watch, smart glasses, smart apparel, smart accessory), a laptop, a tablet, a set top box, a display device (e.g., television, monitor), a digital streaming device, a proxy, a gateway, a transportation device (e.g., on board computer, navigation system, vehicle media center), a sensor node, and/or the like The first component can comprise a first wireless radio. In an aspect, power to at least a portion of the first component can be reduced or turned off. Reducing power consumption of the first component can comprise disconnecting at least a portion of the first component from a power source. For example, all or a portion of a circuit (e.g., a field programmable gate array, an application specific integrated circuit) of the first component can be disconnected from a power source. The first component can comprise a receiver and a transmitter. Reducing power consumption of the first component can comprise reducing power to, disconnecting power from, and/or the like all, or a portion of the receiver, all or a portion of the transmitter, and/or the like. Reducing power consumption of the first component can comprise reducing power to, and/or disconnecting power from a radio front end associated with the first component. Reducing power consumption of the first component can comprise entering a reduced functionality mode (e.g., power saving mode, sleep mode).

At step 804, a transmission can be monitored for on a second component of the first device. In an aspect, the second component can be an alternate component for sending and/or receiving transmissions via the same protocol. In another aspect, the second component can comprise an additional component for sending and/or receiving transmission via another network and/or protocol. For example, The first device can be configured to use the first component and/or second component to communicate with other devices. Depending on which network and/or protocol supported by the other devices, the first device can select whether to listen for and/or send transmissions using the first component, the second component, or both. Additionally, the first device can support additional components configured to send and/or receive transmissions as appropriate to communicate with the other devices.

In an aspect, the second component can remain powered on and/or retain more functionality than the first component while the first component is powered down and/or reduced in functionality. The second component can comprise a second wireless radio, a second receiver, a second transmitter, a second transceiver, a second radio front end, a second radio, a combination thereof, and/or the like.

In an aspect, the second component can be configured (e.g., based on settings and/or based on hardware components of the second component) as a lower power transceiver than the first component. For example, the first component can be configured as a WiFi (e.g., 802.11) based transceiver (e.g., receiver and/or transmitter). The second component can be configured as a Bluetooth® (e.g., a Bluetooth® low energy) based transceiver, a ZigBee® based transceiver, an infrared transceiver, a combination thereof, and/or the like. As another example, the first component and the second component can be any combination of a WiFi. ZigBee®, Bluetooth®, infrared or other type of receiver, transmitter, and/or transceiver. In another aspect, the first component and the second component can both be configured to use the same protocol (e.g., WiFi, Bluetooth®, Zigbee®, infrared), but the first component can be configured with a different power setting, functionality level, and/or the like than the second component.

At step 806, a transmission from a second device (e.g., client device, access point) can be received on the second component. The second device can comprise a computer, a smart device (e.g., smart phone, smart watch, smart glasses, smart apparel, smart accessory), a laptop, a tablet, a set top box, a display device (e.g., television, monitor), a digital streaming device, a proxy, a gateway, a transportation device (e.g., on board computer, navigation system, vehicle media center), a sensor node, and/or the like. The second device can comprise an access point, such as a wireless access point. The transmission can comprise a request, such as a status request, an online request, a probe request, and/or the like from the second device. The request can comprise a request for a response from the first device. The request can be configured to determine whether the first device is within range of the second device for communication. The transmission can comprise an announcement, such as a beacon, indicating the presence of the second device and/or one or more services provided by the second device.

In an aspect, the transmission can be relayed to the first device via a mesh network connected to the first device via the second component. For example, the mesh network can comprise a plurality of nodes, such as sensor nodes (e.g., door sensor, temperature sensors, window sensors, motion sensors, humidity sensors, cameras). One or more (or each) of the plurality of nodes can be configured to communicate directly with other nodes within range. As an example, a first node of the mesh network can receive the transmission while the second device is out of range for communication with the first device via the first component. The first node can relay the transmission directly to the first device and/or relay the transmission to one or more intermediate nodes within the mesh network, which can relay the transmission to the first device. The mesh network can comprise a ZigBee® network. Bluetooth® network, Z-Wave®, and/or the like.

At step 808, the first component can be powered on and/or otherwise restored in functionality in response to receiving the transmission. Powering on the first component of the first device can comprise increasing power and/or restoring power to at least a portion of the first component. Powering on the first component can comprise connecting at least a portion of the first component to the power source. For example, all or a portion of the circuit (e.g., field programmable gate array, application specific integrated circuit) of the first component can be connected to the power source. The first component can comprise a receiver, transmitter, and/or the like. Powering on the first component can comprise increasing power to, connecting power to, and/or the like all or a portion of the receiver, all or a portion of the transmitter, and/or the like. Powering on the first component can comprise increasing power to, and/or connecting power to the radio front end associated with the first component. Powering on the first component can comprise entering a default functionality mode (e.g., default power mode). Default functionality mode can comprise a standard and/or initial operational mode set by a user, manufacturer, service provider, and/or other prior functionality mode of the network device.

In an exemplary aspect, the methods and systems can be implemented on a computer 901 as illustrated in FIG. 9 and described below. By way of example, the first device 102, the second device 124, and/or the nodes 122 of FIG. 1 can be computers as illustrated in FIG. 9. Similarly, the methods and systems disclosed can utilize one or more computers to perform one or more functions in one or more locations. FIG. 9 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 901. The components of the computer 901 can comprise, but are not limited to, one or more processors 903, a system memory 912, and a system bus 913 that couples various system components including the one or more processors 903 to the system memory 912. In an aspect, the system can utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 913, and all buses specified in this description can also be implemented over a wired or wireless network connection and each of the subsystems, including the one or more processors 903, a mass storage device 904, an operating system 905, functionality management software 906, functionality management data 907, a network adapter 908, the system memory 912, an Input/Output Interface 910, a display adapter 909, a display device 911, and a human machine interface 902, can be contained within one or more remote computing devices 914a,b,c at physically separate locations, connected through buses of this form, in effect implementing a fully distributed system.

The computer 901 typically comprises a variety of computer readable media. Exemplary readable media can be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as the functionality management data 907 and/or program modules such as the operating system 905 and the functionality management software 906 that are immediately accessible to and/or are presently operated on by the one or more processors 903.

In another aspect, the computer 901 can also comprise other removable/non-removable, volatile/non-volatile computer storage media. By way of example, FIG. 9 illustrates the mass storage device 904 which can provide non-volatile storage of computer code, computer readable instructions, data structures, program modules, and other data for the computer 901. For example and not meant to be limiting, the mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, the operating system 905 and the functionality management software 906. Each of the operating system 905 and the functionality management software 906 (or some combination thereof) can comprise elements of the programming and the functionality management software 906. The functionality management data 907 can also be stored on the mass storage device 904. The functionality management data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 901 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 903 via the human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another aspect, the display device 911 can also be connected to the system bus 913 via an interface, such as the display adapter 909. It is contemplated that the computer 901 can have more than one display adapter 909 and the computer 901 can have more than one display device 911. For example, a display device can be a monitor, an LCD (Liquid Crystal Display), or a projector. In addition to the display device 911, other output peripheral devices can comprise components such as speakers (not shown) and a printer (not shown) which can be connected to the computer 901 via the Input/Output Interface 910. Any step and/or result of the methods can be output in any form to an output device. Such output can be any form of visual representation, including, but not limited to, textual, graphical, animation, audio, tactile, and the like. The display device 911 and computer 901 can be part of one device, or separate devices.

The computer 901 can operate in a networked environment using logical connections to one or more remote computing devices 914a,b,c. By way of example, a remote computing device can be a personal computer, portable computer, smartphone, a server, a router, a network computer, a peer device or other common network node, and so on. Logical connections between the computer 901 and a remote computing device 914a,b,c can be made via a network 915, such as a local area network (LAN) and/or a general wide area network (WAN). Such network connections can be through the network adapter 908. The network adapter 908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components reside at various times in different storage components of the computer 901, and are executed by the data processor(s) of the computer. An implementation of the functionality management software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology. CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    determining, by a network device, timing information associated with reduced functionality of the network device, wherein the timing information is indicative of a time window during which only transmissions that do not satisfy a priority threshold are expected to be received by the network device;
    sending, to a user device, the timing information;
    reducing functionality of a first transceiver of the network device during the time window;
    receiving, from the user device via a second transceiver of the network device and during the time window, a transmission, wherein the network device is configured to communicate via the second transceiver during the time window;
    restoring functionality of the first transceiver after the time window; and
    sending, to the user device via the first transceiver, information.

2. The method of claim 1, wherein the network device is further configured to one or more of send data to other devices or receive data from the other devices during the time window.

3. The method of claim 1, further comprising disconnecting, during the time window, at least a portion of the network device from a power source.

4. The method of claim 3, further comprising reconnecting, after the first time window, the at least a portion of the network device to the power source.

5. The method of claim 1, wherein determining the timing information comprises determining that transmissions associated with the user device do not satisfy the priority threshold.

6. The method of claim 1, wherein determining the timing information comprises determining a schedule for conserving power.

7. The method of claim 1, wherein determining the timing information comprises receiving, from another device, an instruction to conserve power.

8. The method of claim 1, wherein the time window is determined based on an activity history wherein the activity history comprises a history of at least one of communication, processing, power level, or functionality level associated with the network device.

9. A method comprising:
    determining, by a network device, that a current time is within a time window associated with reduced functionality of the network device, wherein the time window is based on timing information comprising a time during which transmissions associated with a user device do not satisfy a priority threshold;
    reducing, based on the current time being within the time window, functionality of a first transceiver of the network device;
    receiving, from the user device via a second transceiver of the network device, a signal, wherein the network device is configured to communicate via the second transceiver during the time window;
    restoring, based on the signal, functionality of the transceiver; and
    sending, to the user device via the first transceiver, information.

10. The method of claim 9, further comprising reducing, based on the time window, a number of transmissions associated with a third transceiver of the network device.

11. The method of claim 9, wherein the signal comprises a probe request configured to determine a presence of the network device.

12. The method of claim 9, further comprising receiving, after the time window, a quantity of transmissions associated with the first transceiver.

13. The method of claim 9, wherein the network device is further configured to one or more of send data to other network devices via the second transceiver or receive data from the other network devices via the second transceiver.

14. The method of claim 9, wherein the time window is further based on an instruction from another network device to conserve power.

15. An apparatus comprising:
    one or more processors; and
    memory storing processor executable instructions that, when executed by the one or more processors, cause the apparatus to:
        determine timing information associated with reduced functionality of the apparatus, wherein the timing information is indicative of a time window during which only transmissions that do not satisfy a priority threshold are expected to be received by a network device,
        reduce functionality of a first transceiver during the time window, and
        restore functionality of the first transceiver after the time window;
    the first transceiver, in communication with the one or more processors, configured to, send the timing information to a user device, and send information to the user device after the time window; and a second transceiver, in communication with the one or more processors, configured to, receive a transmission from another user device during the time window.

16. The apparatus of claim 15, wherein the time window comprises a time when a device associated with the apparatus is configured for reduced functionality.

17. The apparatus of claim 15, wherein the processor executable instructions, when executed by the one or more processors, further cause the apparatus to disconnect, based on the time window, at least a portion of the apparatus from a power source.

18. The apparatus of claim 17, wherein the processor executable instructions that, when executed by the one or more processors, cause the apparatus to disconnect the at least a portion of the apparatus from the power source, further cause the apparatus to reconnect the at least a portion of the apparatus to the power source.

19. The apparatus of claim 15, wherein the processor executable instructions, when executed by the one or more processors, further cause the apparatus to determine a schedule for conserving power, wherein the time window is further based on the schedule for conserving power.

20. The apparatus of claim 15, wherein the processor executable instructions, when executed by the one or more processors, further cause the apparatus to receive an instruction to conserve power, wherein the time window is further based on the instruction.

* * * * *